US008495485B2

(12) United States Patent
Rundle

(10) Patent No.: US 8,495,485 B2
(45) Date of Patent: Jul. 23, 2013

(54) SYSTEM, METHOD, AND APPARATUS FOR LOCATION IDENTIFICATION OF CONTENT

(75) Inventor: Eleni Rundle, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 12/827,124

(22) Filed: Jun. 30, 2010

(65) Prior Publication Data

US 2012/0005572 A1 Jan. 5, 2012

(51) Int. Cl.
*G06F 17/00* (2006.01)

(52) U.S. Cl.
USPC ............................ 715/206; 715/207; 715/234

(58) Field of Classification Search
USPC .................. 715/200, 205, 209, 210, 230, 233, 715/234, 273, 805, 206; 709/203, 217; 707/805, 707/999.002, E17.008, E17.009, E17.013
See application file for complete search history.

(56) References Cited

U.S. PATENT DOCUMENTS

| | | | |
|---|---|---|---|
| 6,219,679 B1 * | 4/2001 | Brisebois et al. | 715/206 |
| 6,535,912 B1 | 3/2003 | Anupam et al. | |
| 7,047,502 B2 * | 5/2006 | Petropoulos et al. | 715/781 |
| 7,587,669 B2 | 9/2009 | Rana | |
| 7,594,187 B2 | 9/2009 | Baird et al. | |
| 8,042,036 B1 * | 10/2011 | Sharma et al. | 715/208 |
| 2002/0138624 A1 | 9/2002 | Esenther | |
| 2005/0034063 A1 * | 2/2005 | Baker et al. | 715/513 |
| 2008/0163065 A1 | 7/2008 | Vartiainen et al. | |
| 2009/0070413 A1 | 3/2009 | Priyadarshan et al. | |

OTHER PUBLICATIONS

Olsson, T. et al.,"Understanding :nth-child Pseudo-class Expressions," archived Feb. 3, 2009, downloaded from <"http://web.archive.org/web/20090203012331/http://reference.sitepoint.com/css/understandingnthchildexpressions">, 4 pages.*
Kannan et al.,"Live URLs: Breathing Life Into URLs," WWW 2006, May 23-26, 2006, ACM, 2 pages.*
"A Method of Creating a Bookmark to Any Location in a Web Page." IP.com No. IPCOM000166361D, available at http://www.ip.com/pubview/IPCOM000166361D, (Jan. 2008), 3 pages.
Jaaskelainen et al. "Internal Placemarks for Uniform Resource Locator Bookmark Operations." IBM Technical Disclosure Bulletin, vol. 41, No. 01, IP.com No. IPCOM000122959D, available at http://www.ip.com/pubview/IPCOM000122959D, (Jan. 1998), 3 pages.
"Adding Links to Content." available at http://fc.ak-prepared.com/.onlinehelp/FAV5-0000F7CD/FOV5-0000F7F3/S006711FB-00671200?Templates=Help, last accessed Jun. 30, 2010, 4 pages.

(Continued)

*Primary Examiner* — Cesar Paula
*Assistant Examiner* — James H Blackwell
(74) *Attorney, Agent, or Firm* — Jeffrey T. Holman

(57) ABSTRACT

An implementation is described for identifying a location of content within a document. The implementation includes displaying at least a portion of the document on a display of a computer. The implementation also includes receiving a user selection of the location within the document. The implementation also includes generating a location identifier. The location identifier describes the location within the document in terms of a document structure implemented by the document. The implementation also includes encoding the location identifier into a uniform resource locator (URL). The URL links to the document and identifies the location within the document. The implementation also includes sending the URL from the computer to a second computer. The second computer is configured to decode the URL and interpret the location identifier to display the visual marker at the location within the document.

19 Claims, 8 Drawing Sheets

OTHER PUBLICATIONS

Heng "How to Link Directly to a Line or Section on a Web Page with Dreamweaver." available at http://www.thesitewizard.com/webdesign/link-directly-line-section-dreamweaver.shtml, last accessed Jun. 30, 2010, 6 pages.

"Tynt Insight." available at http://www.tynt.com/tynt-insight/, last accessed Jun. 30, 2010, 1 page.

\* cited by examiner

SYSTEM, METHOD, AND APPARATUS FOR LOCATION IDENTIFICATION OF CONTENT

BACKGROUND

The internet and other electronic network connections have made it possible to access vast resources of information. The available information takes many forms. For example, information can be located in web pages, document shares, pdfs, images, text files, etc. For many of these forms, administrator privileges must be granted for a user to mark or annotate the information for future personal reference. However, in many instances, the user cannot gain these privileges and, thus, cannot annotate or markup any part of the resource.

Additionally, many of the above-mentioned forms of information are lengthy or difficult to navigate. Conventional systems for bookmarking content in a document through a browser lack the ability to specify a location within the document and send a bookmark specific to that location to another user. Therefore, if the document is lengthy or difficult to navigate and the sender does not have privileges to allow for markup of the document, the user cannot send a specific location bookmark to another user. As a result, efficiency in revisiting the information or referencing the information to another party is diminished as the location must be searched out each time.

SUMMARY

Embodiments of a computer program product are described. In one embodiment, the computer program product includes a computer useable storage medium to store a computer readable program for identifying a location of content within a document. The computer readable program, when executed on a computer, causes the computer to perform operations. The operations include displaying at least a portion of the document on a display of the computer. The operations also include receiving a user selection of the location within the document. The operations also include generating a location identifier. The location identifier describes the location within the document in terms of a document structure implemented by the document. The operations also include encoding the location identifier into a uniform resource locator (URL). The URL links to the document and identifies the location within the document. The operations also include sending the URL from the computer to a second computer. The second computer is configured to decode the URL and interpret the location identifier to display the visual marker at the location within the document. Other embodiments of the computer program product are described.

Embodiments of an apparatus are also described. An embodiment of the apparatus includes a computer display, a browser client, and a network interface. The browser client is implemented on the computer display to display at least a portion of a document. The browser client generates a visual marker corresponding to a location within the document viewable on the computer display via the browser client. The browser client also encodes the visual marker into a browser-friendly URL for communication to a network. The browser-friendly URL links to the document and identifies the location of the visual marker within the document. The network interface connects the apparatus to the network and facilitates electronic communications between the apparatus and a second browser client. The second browser client decodes the URL and displays the visual marker at the location within the document. Other embodiments of the apparatus are also described.

Embodiments of a method are also described. An embodiment of the method includes displaying at least a portion of the document on a display of the computer. The method also includes receiving a user selection of the location within the document. The method also includes generating a location identifier. The location identifier describes the location within the document in terms of a document object model implemented by the document. The method also includes encoding the location identifier into a uniform resource locator (URL). The URL links to the document and identifies the location within the document. The method also includes sending the URL from the computer to a second computer. The second computer is configured to decode the URL and interpret the location identifier to display the visual marker at the location within the document. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 3 depicts a view of one embodiment of content in a browser with a location identifier add-on.

Throughout the description, similar reference numbers may be used to identify similar elements.

DETAILED DESCRIPTION

Figure 1:
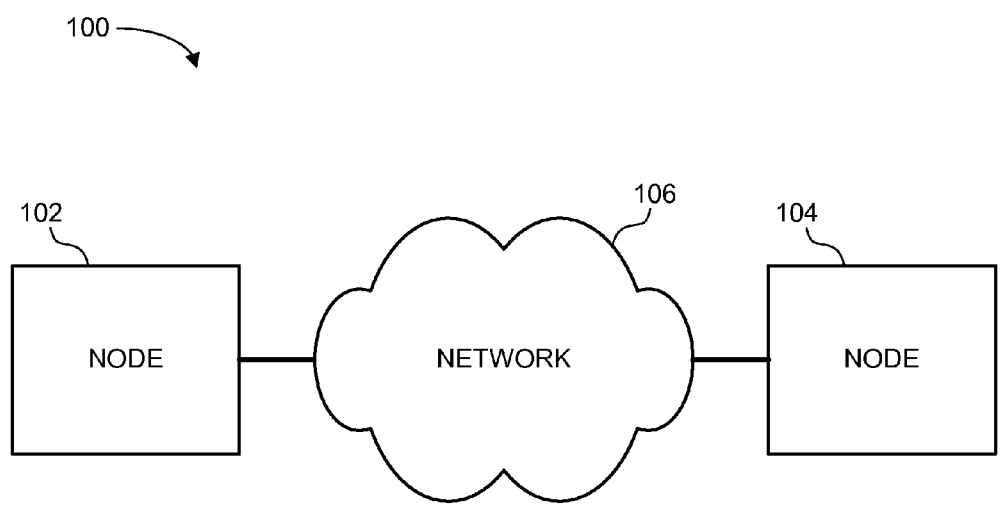
FIG. 1 depicts a schematic block diagram of one embodiment of a communication system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated. The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments facilitate encoding a uniform resource locator (URL) with location identifier information describing a location in a document viewable on a display and sending that encoded URL to a recipient.

Additionally, at least some of the described embodiments facilitate decoding the URL and interpreting the location identifier. Although not limiting in all embodiments, the term "document" may refer to an online shared document, a webpage, a text file, an image file, or any other computer viewable information or file. In other words, a document is any object that has a structure with content. The content of the document may be audio, text, image, and/or video.

In some embodiments, encoding and decoding systems are integrated into a single package for use in a single computer. In this manner, the user may store and retrieve or send and receive the encoded data. In other embodiments, separate encoding and decoding systems are implemented on separate computers that are connected via a network or other communication channel. The encoding system is implemented on a first computer to generate a location identifier corresponding to content on a display. The encoding system may also add information related to visual effects or other functionality of the location identifier. Some examples of location identifier functionality include comments, sequencing, tracking, etc. The encoding system also encodes a URL with the information corresponding to the content, a location within the content, and the visual effects and other functionality of the location identifier. The encoding system also stores the URL to a computer resource. One example of a computer resource includes computer memory.

In one embodiment, the decoding system is implemented on a second computer. In general, the location identifier information is communicated from the first computer to the second computer so that the second computer can locate and display the content at a location corresponding to the location identifier. In a specific embodiment, the decoding system displays the content to the user and places at least one visual location identifier within the content to indicate a location within the content to the user. In some embodiments, the decoding system also displays visual effects and interactive tools that correspond to the location identifier.

An advantage of at least one embodiment described herein is that it would not be required to have writing privilege for content in order to create a location identifier corresponding to a location within the content. Additionally, the location identifier can easily be copied and pasted to a document, email, blog, social site, text message, webpage, etc. for storing the location identifier or sharing the location identifier with another person or system.

FIG. 1 depicts a schematic block diagram of one embodiment of a communication system 100. Although the communication system 100 is shown and described with certain components and functionality, other embodiments of the communication system 100 may include fewer or more components to implement less or more functionality.

The illustrated communication system 100 includes multiple nodes 102 and 104 connected together via a computer communication network 106. The network 106 may be an intranet, the internet, a local area network (LAN), a wide area network (WAN), a cellular network, or another type of network, or a combination of different types of networks. It should also be noted that the communication system 100 may include more than two nodes.

In some instances, the nodes 102 and 104 are also referred to as computers 102 and 104. Each of the nodes 102 and 104 may be referred to as a sending node and/or a receiving node, depending on the direction of data flow between the nodes 102 and 104 at any given time. For reference in the descriptions herein, the first node 102 is referred to as a sending computer 102 for use by a user who generates a URL corresponding to a location identifier for a location within a content viewed on the sending computer 102. The second node 104 is referred to as a receiving computer 104 for use by a user who receives the URL as sent from the sending computer 102. The user at the receiving computer 104 is then able to decode and activate the URL to indicate at least one location within the content based on the information from the URL.

Figure 2:
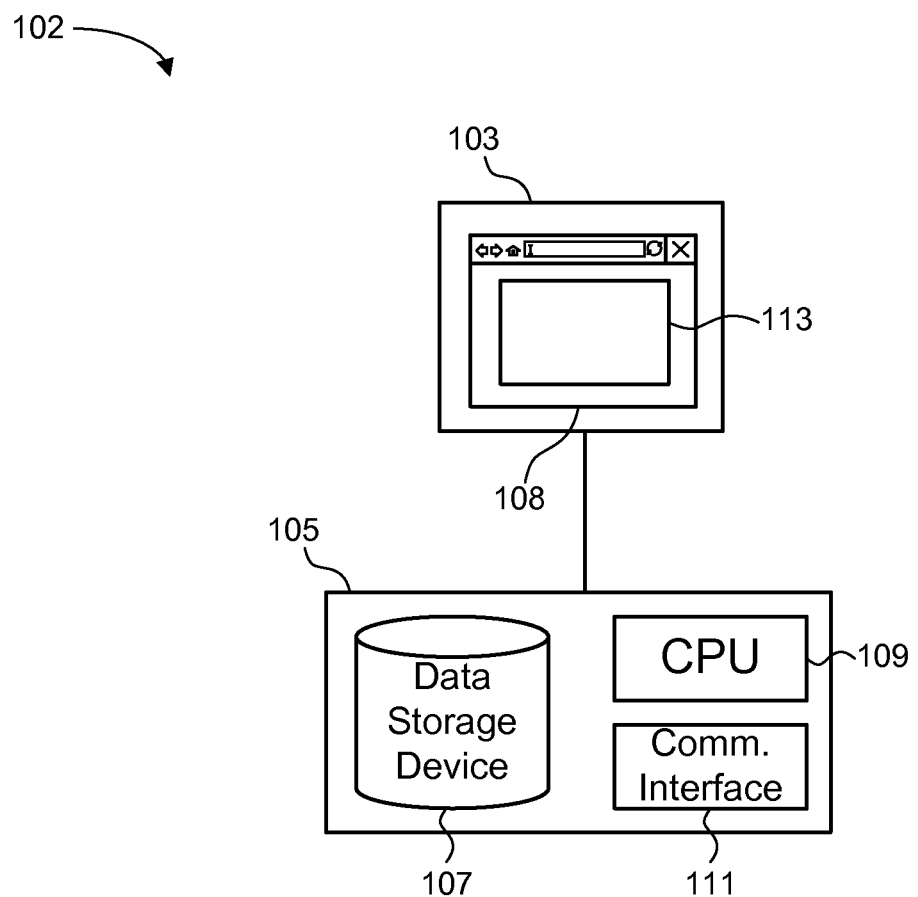
FIG. 2 depicts a schematic diagram of one embodiment of a computer with a display.

FIG. 2 depicts a schematic diagram of one embodiment of a computer of FIG. 1 with a display. While the sending computer 102 is described herein, it should be noted that the schematic diagram of FIG. 2 may be applied to the receiving computer 104 and other embodiments may include fewer or more components to implement fewer or more functions. The illustrated embodiment includes a computer display 103 and a core 105. The computer display 103 displays a browser 108 with a location identifier add-on 113. The add-on 113 is defined as code that is incorporated into the browser 108. The core 105 includes a data storage device 107, a CPU 109, and a communication interface 111. In general, the CPU 109 includes one or more processing units, in any configuration, to process instructions on the sending computer 102. More specifically, the CPU 109 may process instructions to implement one or more application programs through which a user can interact with the sending computer 102.

The data storage device 107 stores software instructions and/or other data that may be used by the CPU 109. The data storage device 107 is representative of at least one type of computer readable or computer useable storage medium. The data storage device 107 may be any type of storage or memory device such as any of the following: volatile and non-volatile media, removable and non-removable media, random access memory (RAM), read-only memory (ROM), electrically erasable programmable ROM (EEPROM), flash memory, and any other type of internal or external data storage media. At least a portion of the data storage device 107 contains rewriteable memory so that information can be written to the data storage device 107 by the CPU 109 or other components within the sending computer 102. The data storage device 107 also stores instructions for a computer readable program to implement one or more application programs on the client computer 102. Additionally, the data storage device 107 may store instructions for displaying information on the display 103.

The display 103 may be any type of graphical display such as a cathode ray tube (CRT) monitor, a liquid crystal display (LCD) monitor, or another type of display device. In some embodiments, the display 103 displays a graphical user interface (GUI) for one or more application programs implemented by the CPU 109.

The communication interface 111 generally facilitates communications with other computer devices (e.g., the receiving computer 104 shown in FIG. 1) through a network 106. In one embodiment, the communication interface 111 includes a modem. In another embodiment, the communication interface 111 includes a network interface card. Other embodiments may use other types of communication interfaces or a combination of different communication interfaces.

By storing and executing certain software programs on the sending computer 102, the sending computer 102 can facilitate generating, storing, and sending location identifiers from the display 103. The location identifier information is encoded into a URL format to be appended to the URL for the content by the location identifier add-on 113. The modified URL is associated with the content viewed on the display 103 of the sending computer 102 and includes the appended location identifier string. The location identifier corresponds to at least one location within a content viewed on the sending computer 102.

The generated URL with the location identifier can then be transmitted via the interface 111 to the receiving computer 104 such that the receiving computer 104 may decode the URL and access the content for viewing and review. By sending the location identifier data in the URL, the receiving computer 104 can display the content associated with the location identifier portion of the URL to a user. This process can be particularly helpful in situations in which the content is long or difficult to understand or only a portion of the content is needed. Also, generating the location identifiers for the content allows a user to save the location identifiers and post them to a blog, include them in an email, or otherwise make them accessible to another user.

Figure 3:
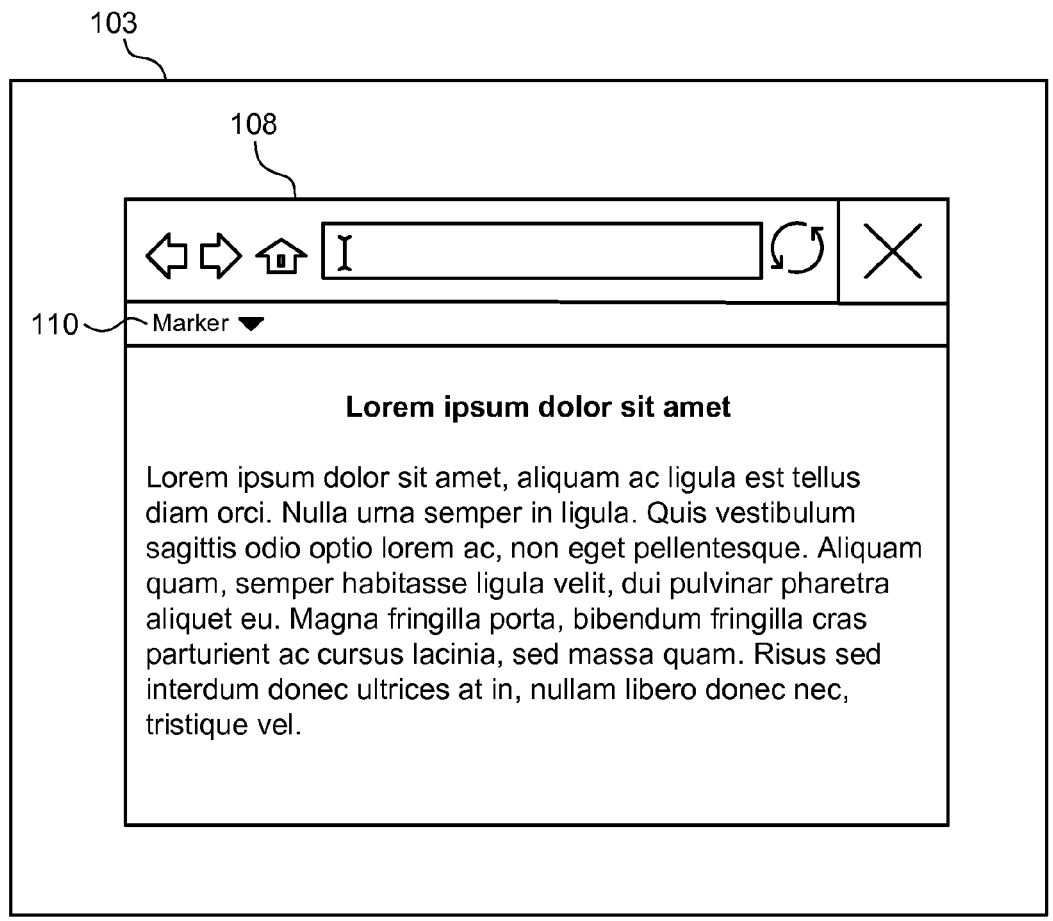

FIG. 3 depicts a view of one embodiment of content in a browser 108 with a location identifier add-on 113. The illustrated computer display 103 includes a browser 108 with a marker tab 110. In general, the browser 108 is displayed on a computer monitor or display. In some embodiments, other methods are used to display the browser 108 to a user. The browser 108 allows the user to view content. In particular, the browser 108 facilitates browsing internet sites, reading email, viewing documents, etc. In many cases, however, the content viewed through the browser 108 does not grant the user sufficient rights to edit, mark-up, or annotate any portion of the content.

The marker tab 110 corresponds to an add-on 113 for the browser 108. The marker tab 110 is illustrated in FIG. 3 as an additional drop-down menu bar added to the interface of the browser 108. In other embodiments, the marker tab 110 may be integrated into the existing menus of the browser 108 or into a separate window or icon that is generated in response to the user activating the add-on 113. Other embodiments may integrate the marker tab 110 into the browser 108 in other manners. Although described as an add-on, embodiments of the current invention may be integrated with the browser 108.

Figure 4:
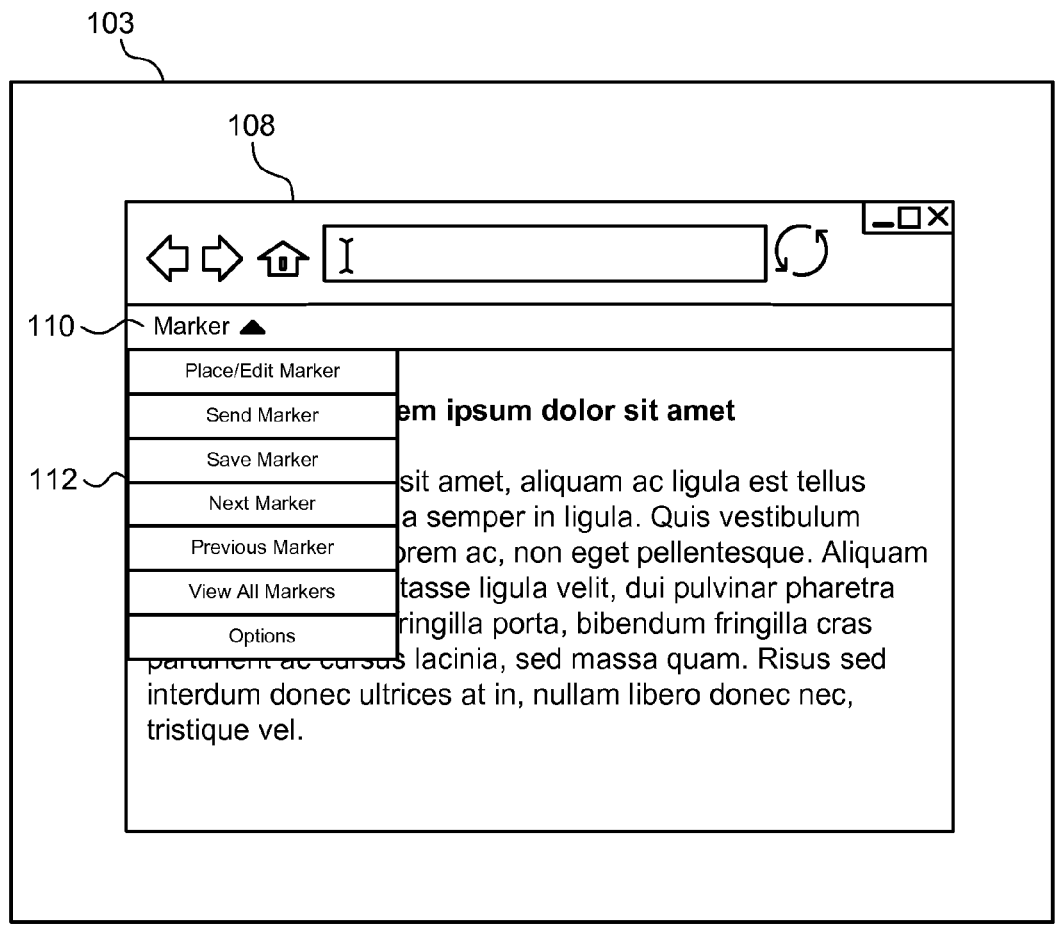
FIG. 4 depicts one embodiment of the browser of FIG. 3 with an interactive list.

FIG. 4 depicts one embodiment of the browser 108 of FIG. 3 with an interactive list 112. In the depicted embodiment, the interactive list 112 is active. In the illustrated embodiment, the interactive list 112 includes functionality to place, modify, navigate, and view location identifiers throughout the content of the browser 108. In some embodiments, the interactive list 112 facilitates sending information across the network 106. For example, the interactive list 112 may include a send option. In this embodiment, the add-on 113 may interact with other programs to facilitate sending the information. In other embodiments, the add-on 113 generates the information and displays it to the user. Other embodiments of the interactive list 112 may include more or less functionality. For example, the user may come to a location in the document where it would be advantageous to have a location identifier. The user may select the marker tab 110 to activate the interactive list 112 and elect to place a location identifier by selecting place/edit marker from the interactive list 112 and selecting the location where the location identifier is desired.

In some embodiments, the user may elect to place multiple location identifiers at multiple locations within the content. The sending user may also select the sequence in which the multiple location identifiers will be presented to the receiving user. In some embodiments, the sending user may specify certain effects for the transition between the multiple location identifiers. For example, the receiving user may see the content scroll at a certain speed from identifier to identifier, the screen may fade out on one identifier and fade in on the next identifier, or other effects may be produced.

In some embodiments, the interactive list 112 is activated with a key-stroke. In other embodiments, the interactive list 112 is activated by selecting a portion of the content. Other embodiments, allow the user to activate the interactive list 112 through other gestures or actions. In another embodiment, contextual segments of the content may be shown simultaneously with intermediate content between the identified content being hidden or removed.

In some embodiments, multiple visual markers 114 may be encoded into a single URL. For example, the URL might simply have multiple strings encoded within the URL. Each visual marker 114 corresponding to a location in the document might have an individual string and each string can be encoded into the URL or a single string containing information for the multiple locations can be encoded. Also, the URL may have some coding to determine a sequence or effect of navigation for the visual markers 114. In other embodiments, the user may configure the add-on 113 to apply an effect between visual markers 114. In some embodiments, the user may view the locations of the visual markers 114 in a certain sequence or in order of appearance in the document. In other embodiments, the add-on 113 may generate a standard visual affect between each visual marker 114. For example, the add-on 113 may scroll the content quickly from the location of a first visual marker 114 to the location of a second visual marker 114 in the document. Additionally, the add-on 113 may fade out on the first visual marker 114 and fade in on the next. Other embodiments may implement other mechanics for navigating multiple locations in the document corresponding to visual markers 114.

Figure 5:
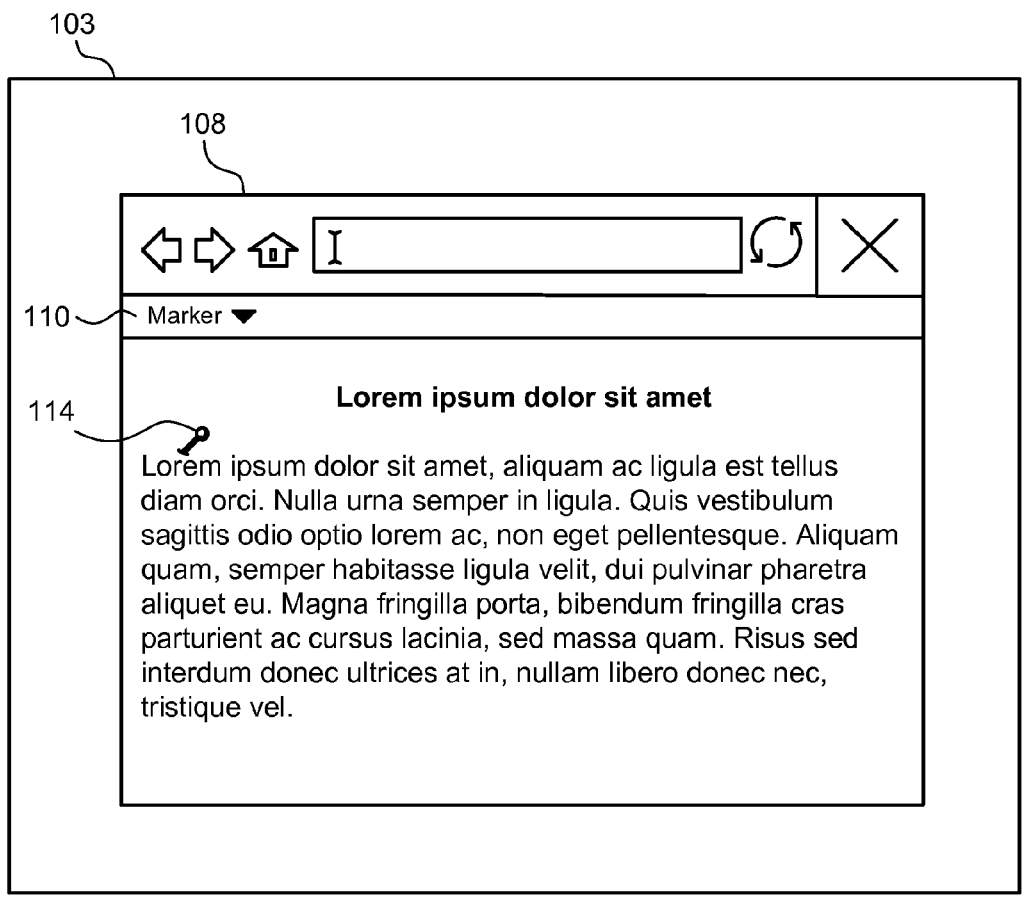
FIG. 5 depicts one embodiment of the content in the browser of FIG. 3 with a location identifier.

FIG. 5 depicts one embodiment of content in the browser 108 of FIG. 3 with a location identifier selected. In the illustrated embodiment, the location identifier is shown as a visual marker 114. The visual marker 114 visually distinguishes a location in the content to facilitate navigation by the user. In one embodiment, the location identifier information corresponds to a location in the content based on the document object model (DOM) and cascading style sheet selectors (CSS selectors). In the depicted embodiment, which is based on the DOM and CSS selectors, the location identifier is unrelated to the text or media of the content but corresponds to a specific location within the content itself regardless of information at that location. In this manner, the user does not need advanced rights for the content in order to generate location identifiers for certain locations in the content. No modification is performed on the content; however, the user is able to generate a location identifier based on the physical location corresponding to the specific location in the content. For example, if the user wishes to place a visual marker 114 over an image on a webpage, the location identifier would be generated with information describing a hierarchical location of the image relative to the structural components of the page such as headers, margins, and other location-specific metrics. The visual marker 114 would be placed at that location without directly corresponding to the video. Other embodiments may utilize other location parameters relative to the content to generate the location identifier.

In the illustrated embodiment, the visual marker 114 is depicted as an image of a push pin at the location described by the location identifier. In another embodiment, the visual marker 114 includes an animated image. Other embodiments include other devices for visually distinguishing the location identifier. For example, the visual marker may include highlighting the location and/or generating a box at the location.

Figure 6:
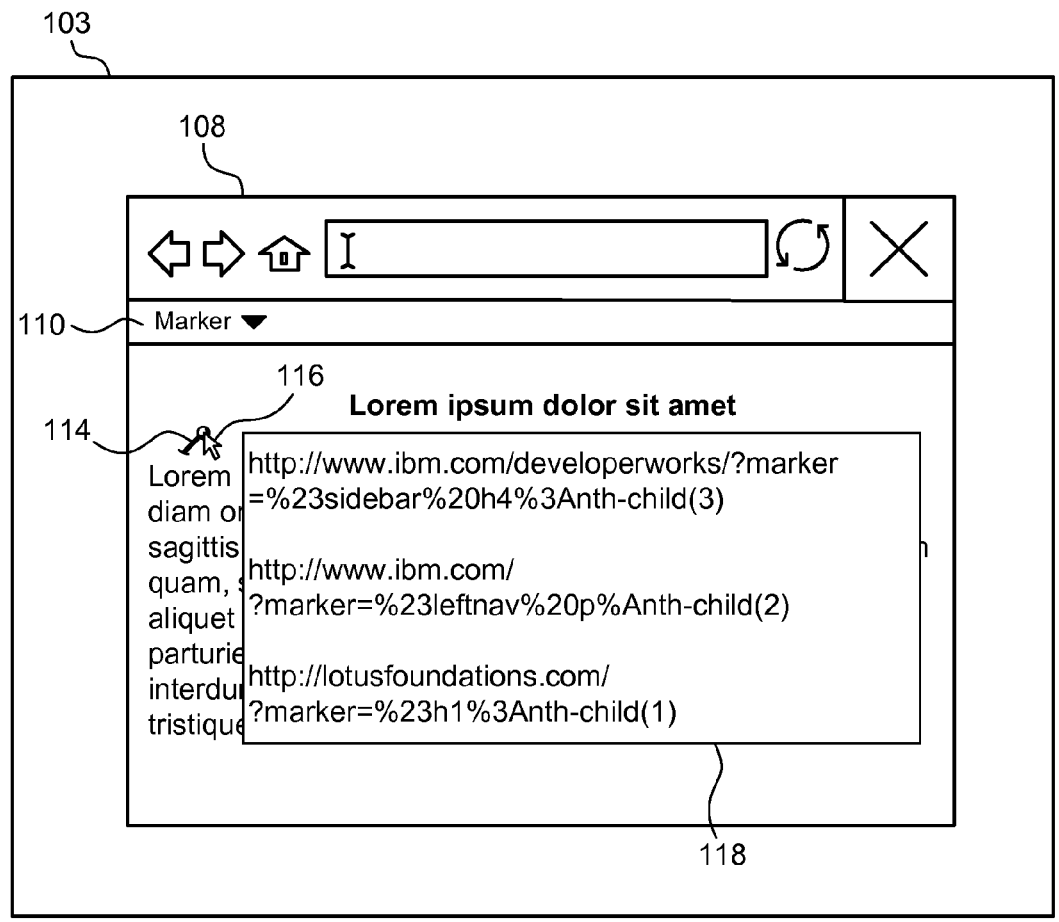
FIG. 6 depicts one embodiment of the location identifier of FIG. 5 with a pop-up box.

FIG. 6 depicts one embodiment of the marker 114 of FIG. 5 with a pop-up box 118. In the illustrated embodiment, in response to a cursor 116 at the visual marker 114, a pop-up box 118 is generated. In some embodiments, the pop-up box 118 is generated in response to the user hovering the cursor 116 over the visual marker 114. In other embodiments, the pop-up box 118 is generated in response to a key-stroke. Other inputs such as clicking on the visual marker 116 may also generate the pop-up box 118. The pop-up box 118 also displays information to the user. In the illustrated embodiment, the pop-up box 118 displays information about other location identifiers in URL form. These other location identifiers may be selected to navigate to the associated visual marker in the current document or a separate document. In other embodiments, the pop-up box 118 displays a description of the content found at the location described by the location identifier. In this way, a user would be able to determine if the current content is the same as the content that was present when the location identifier was initially inserted. In some embodiments, the pop-up box 118 displays options corresponding to the visual marker 116. For example, the pop-up box 118 may provide the functionality previously associated with the marker tab 110. Other embodiments include other functionality incorporated into the pop-up box 118.

The location of the pop-up box 118 may be changed by dragging the box 118 to another location. For example, the user may find that the illustrated location of the pop-up box 118 interferes with reading the content associated with the visual marker 114. In some embodiments, the user may change the box 118 to be at least semi-transparent or to be displayed in a different location, such as a message center within the browser 108 or a separate window.

Figure 7:
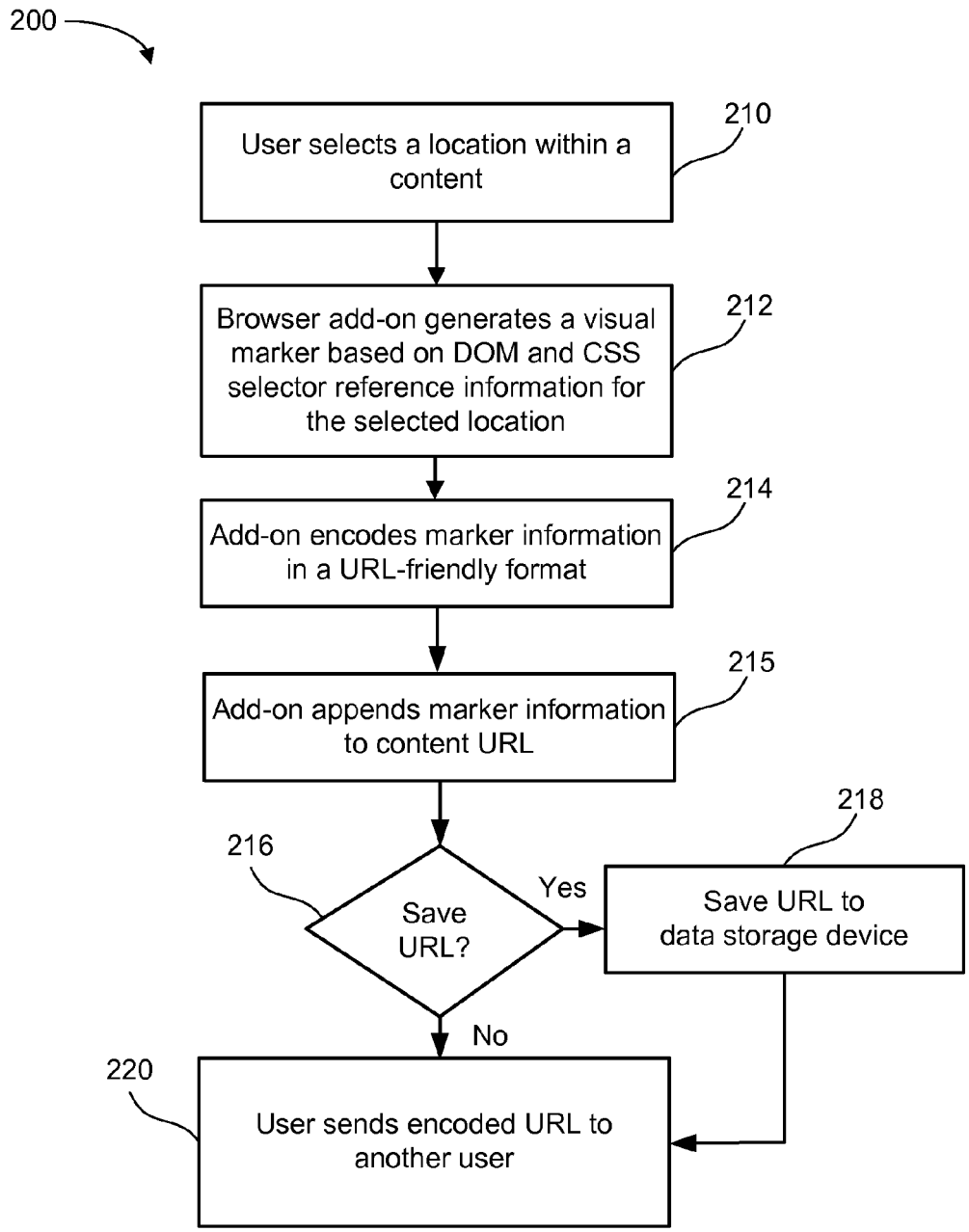
FIG. 7 depicts a schematic flow chart diagram of one embodiment of a method for generating a location identifier.

FIG. 7 depicts a schematic flow chart diagram of one embodiment of a method 200 for generating a location identifier. Although the method 200 is described in conjunction with the communication system 100 and network 106 of FIG. 1, embodiments of the method 200 may be implemented with other types of networks and/or communication systems.

In the illustrated method 200, a user selects 210 a location within content. The selection may be done by clicking, highlighting, drag-and-drop, touching, hovering, a key-stroke, or other actions. The browser add-on 113 generates 212 a visual marker based on DOM and CSS selector reference information for the selected location. The add-on 113 encodes 214 the location reference information into a URL format. The add-on 113 appends 215 the marker information to the content URL. The user chooses 216 whether to save the location within the content. If the user chooses to save the marker 114, the URL is saved 218 to the data storage device 107. The user then sends 220 the URL to another user via direct link, message, post, or other communication facility. If the user elects not to save the marker 114, the URL is sent 220 without saving it to the data storage device 107. Sending the URL may include copying and pasting the URL to a separate program. Sending the URL may include interfacing the add-on 113 with the network 106 to send the URL directly via the network 106. In other embodiments, the add-on 113 sends the URL by other processes.

Figure 8:
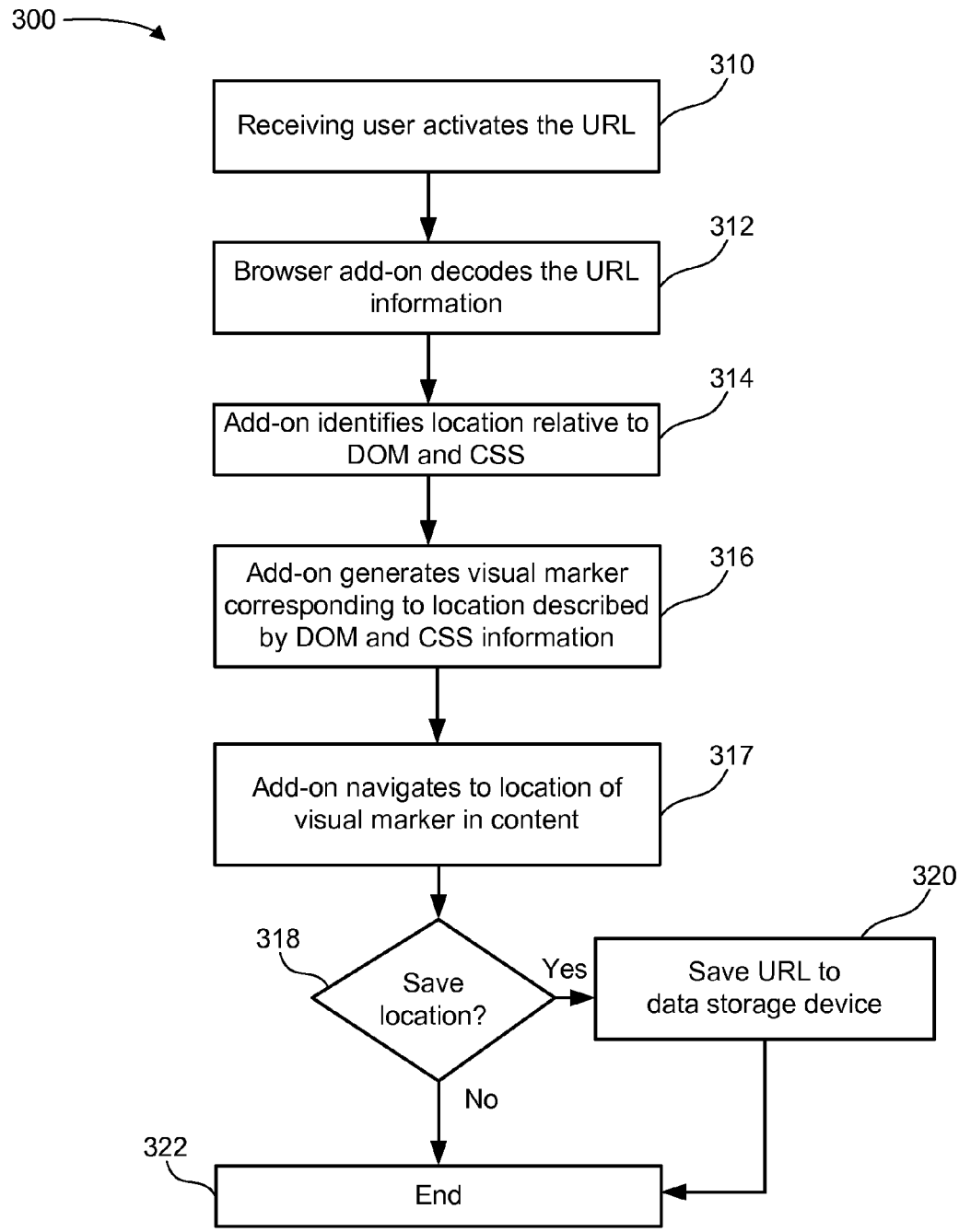
FIG. 8 depicts a schematic flow chart diagram of one embodiment of a method for interpreting a location identifier.

FIG. 8 depicts a schematic flow chart diagram of one embodiment of a method 300 for interpreting a location identifier. Although the method 300 is described in conjunction with the receiving computer 104 and the communication system 100 of FIG. 1, embodiments of the method 300 may be implemented with other types of computers and/or communication systems.

In the illustrated method 300, a user receives and activates 310 the uniform resource locator (URL). The browser add-on 113 decodes 312 the URL DOM and CSS information. The add-on 113 identifies 314 the location within the content based on the DOM and CSS of the content. The browser add-on 113 generates 316 a visual marker 114 corresponding to the location described by the DOM and CSS information from the URL. The add-on 113 navigates 317 to the location of the visual marker 114 within the content. The user chooses 318 whether to save the location. If the user chooses to save the marker 114, the URL is saved 320 to the data storage device 107. The process then ends 322. In some embodiments, the user may navigate to the next marker to repeat the method 300.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of a combination of hardware and software elements. In one embodiment, the invention is implemented in an electronic storage device containing software, which includes but is not limited to firmware, resident software, microcode, etc. Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can contain or store the program for use by or in connection with the instruction execution system, apparatus, or device. Further, the computer-useable or computer-readable storage medium can be an electronic, magnetic, optical, electromagnetic, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product comprising a non-transitory computer useable storage medium to store a computer readable program for identifying a plurality of locations of content within a document, wherein the computer readable program, when executed on a computer, causes the computer to perform operations comprising:
    displaying at least a portion of the document on a display of the computer;
    receiving a user selection of the location within the document;
    receiving user selections of the plurality of locations within the document;
    generating a plurality of location identifiers, wherein the plurality of location identifiers correspond to the plurality of locations within the document in terms of a document structure implemented by the document;
    encoding the plurality of location identifiers into a uniform resource locator (URL), wherein the URL links to the document and identifies the plurality of locations within the document; and
    generating a display instruction wherein the display instruction is configured, upon execution, to implement a transition effect corresponding to navigation between a first one of the plurality of location identifiers and a second one of the plurality of location identifiers;
    encoding the URL with the display instruction; and
    sending the URL from the computer to a second computer, wherein the second computer is configured to decode the URL.

2. The computer program product of claim 1, wherein the computer readable program, when executed on the computer, causes the computer to perform further operations comprising generating a visual marker at least at one of the plurality of locations described by the location identifier.

3. The computer program product of claim 1, wherein the computer readable program, when executed on the computer, causes the computer to perform further operations comprising storing the URL on the computer useable storage medium.

4. The computer program product of claim 1, wherein the document structure comprises a document object model (DOM), and each of the plurality of location identifiers specifies an object within the DOM.

5. The computer program product of claim 1, wherein the computer readable program, when executed on the computer, causes the computer to perform further operations comprising generating a cascading style sheet selector reference to identify the plurality of locations within the document.

6. The computer program product of claim 1, wherein the computer readable program, when executed on the computer, causes the computer to perform further operations comprising displaying a view of information corresponding to the plurality of location identifiers and the corresponding URL.

7. The computer program product of claim 1, wherein the computer readable program, when executed on the computer, causes the computer to perform further operations comprising:
    generating a display instruction wherein the display instruction is configured, upon execution, to implement an effect corresponding to the URL; and
    encoding the URL with the display instruction.

8. The computer program product of claim 7, wherein the display instruction is configured, upon execution, to implement a visual transition effect on a corresponding one of the plurality of location identifiers to cause a visual change to the corresponding one of the plurality of location identifiers during display on a recipient display.

9. The computer program product of claim 7, wherein the display instruction is further configures, upon execution, to display the at least one of a list of data, the list of data comprising:
    comment data;
    sequence data; and
    visual effect data to describe an effect on the corresponding one of the plurality of location identifiers.

10. The computer program product of claim 7, wherein the display instruction is configured, upon execution, to display an interactive tools menu, the interactive menu comprising at least one of a list of tools for managing the location identifier, the list comprising:
    generation of a new location identifier;
    editing of the new location identifier;
    sending the new location identifier;
    saving the new location identifier;
    navigation through the plurality of location identifiers; and
    display of the plurality of location identifiers.

11. The computer program product of claim 7, wherein the display instruction is further configured to execute in response to a user hovering a cursor over one of the plurality of location identifiers.

12. The computer program product of claim 7, wherein the display instruction is further configured to execute in response to a user selecting one of the plurality of location identifiers.

13. An apparatus comprising:
    a computer display;
    a browser client implemented on the computer display to display at least a portion of a document, wherein the browser client is configured to:
        generate a plurality of location identifiers corresponding to a plurality of locations within the document viewable on the computer display via the browser client;
        encode the plurality of location identifiers into a browser-friendly URL for communication to a network, wherein the browser-friendly URL links to the document and identifies the plurality of location identifiers within the document;
        generate a display instruction wherein the display instruction is configured, upon execution, to implement a transition effect corresponding to navigation between a first one of the plurality of location identifiers and a second one of the plurality of location identifiers;

encode the URL with the display instruction; and a network interface to connect the apparatus to the network and to facilitate electronic communications between the apparatus and a second browser client, wherein the second browser client is configured to decode the URL and display the visual marker at the location within the document.

14. The apparatus of claim 13, wherein each of the plurality of locations corresponds to a position in a document structure implemented by the document.

15. The apparatus of claim 14, wherein the document structure comprises a document object model (DOM), and the marker specifies an object within the DOM.

16. The apparatus of claim 14, wherein the object is referenced by a cascading style sheet selector reference to identify the location within the document.

17. A method for identifying a plurality of locations of content within a document, the method comprising:

displaying a least a portion of the document on a display of the computer;

receiving user selections of the plurality of locations within the document;

generating a plurality of location identifiers, wherein the plurality of location identifiers correspond to the plurality of locations within the document in terms of a document object model implemented by the document;

encoding the plurality of location identifiers into a uniform resource locator (URL), wherein the URL links to the document and identifies the plurality of locations within the document;

generating a display instruction wherein the display instruction is configures, upon execution, to implement a transition effect corresponding to navigation between a first one of the plurality of location identifiers and a second one of the plurality of location identifiers;

encoding the URL with the display instruction; and sending the URL from the computer to a second computer, wherein the second computer is configured to decode the URL.

18. The method of claim 17, further comprising generating a visual marker at each of the plurality of locations.

19. The method of claim 18, wherein the display instruction if further configured, upon execution, to display at least one of a list of data, the list of data comprising:

comment data;

sequence data; and visual effect data to, upon execution, implements and effect on one of the plurality of location identifiers to cause a visual change to the visual marker during display on a recipient display; and encoding the URL with the display instruction.

* * * * *